United States Patent
Noishiki et al.

(10) Patent No.: US 10,676,843 B2
(45) Date of Patent: Jun. 9, 2020

(54) ACRYLIC-FIBER MANUFACTURING METHOD

(71) Applicant: Kaneka Corporation, Osaka (JP)

(72) Inventors: Ryohei Noishiki, Hyogo (JP); Masanobu Tamura, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 260 days.

(21) Appl. No.: 15/600,096

(22) Filed: May 19, 2017

(65) Prior Publication Data

US 2017/0253998 A1 Sep. 7, 2017

Related U.S. Application Data

(63) Continuation of application No. PCT/JP2015/078459, filed on Oct. 7, 2015.

(30) Foreign Application Priority Data

Nov. 21, 2014 (JP) .................. 2014-237129

(51) Int. Cl.
*D01F 6/02* (2006.01)
*D01D 10/06* (2006.01)
(Continued)

(52) U.S. Cl.
CPC ............. *D01F 6/02* (2013.01); *C08L 27/06* (2013.01); *C08L 33/08* (2013.01); *D01D 5/06* (2013.01);
(Continued)

(58) Field of Classification Search
CPC ..................................... D01D 5/06; D01D 5/08; D01D 5/082; D01D 10/06; D01F 6/40; C08L 27/06
See application file for complete search history.

(56) References Cited

U.S. PATENT DOCUMENTS 3,080,210 A    3/1963  Ucci
3,088,793 A *  5/1963  Knudsen ............ D01D 10/0436
                                              264/182
(Continued)

FOREIGN PATENT DOCUMENTS

CN    1671896 A    9/2005
CN    1985031 A    6/2007
(Continued)

OTHER PUBLICATIONS

Extended European Search Report issued in European application No. 15861001.4; dated May 17, 2018 (7 pages).
(Continued)

*Primary Examiner* — Nahida Sultana
*Assistant Examiner* — Debjani Roy
(74) *Attorney, Agent, or Firm* — Osha Liang LLP

(57) ABSTRACT

A method for manufacturing an acrylic fiber uses a spinning solution in which an acrylic polymer is dissolved in an organic solvent, the method including reducing an amount of organic solvent by repeatedly spraying water onto coagulated filaments obtained by solidifying the spinning solution and pressing the coagulated filaments with nip rolls. The nip rolls may apply a nip pressure of 0.2 MPa or higher. Thus, a method for manufacturing an acrylic fiber with which an organic solvent in the acrylic fiber can be removed within a short period of time without using a water bath is provided.

17 Claims, 2 Drawing Sheets

(51) Int. Cl.
- *D01D 5/06* (2006.01)
- *D01F 6/40* (2006.01)
- *C08L 27/06* (2006.01)
- *C08L 33/08* (2006.01)
- *D01F 6/10* (2006.01)
- *D01F 6/96* (2006.01)
- *D06M 13/244* (2006.01)

(52) U.S. Cl.
CPC ............... *D01D 10/06* (2013.01); *D01F 6/10* (2013.01); *D01F 6/40* (2013.01); *D01F 6/96* (2013.01); *D06M 13/244* (2013.01)

(56) References Cited

U.S. PATENT DOCUMENTS

| | | | | |
|---|---|---|---|---|
| 3,558,761 | A | * | 1/1971 | Tabara ........................ D01F 6/18 264/182 |
| 3,644,609 | A | * | 2/1972 | Nakagawa et al. ...... D01D 5/30 264/168 |
| 5,286,563 | A | * | 2/1994 | Takahashi .................. D01F 9/22 252/8.83 |
| 2005/0287365 | A1 | | 12/2005 | Yoshimura et al. |
| 2007/0243377 | A1 | | 10/2007 | Nishida et al. |
| 2015/0315364 | A1 | * | 11/2015 | Ohtani ........................ C08J 5/06 524/495 |
| 2018/0119311 | A1 | * | 5/2018 | Noishiki ................... D01D 5/06 |

FOREIGN PATENT DOCUMENTS

| | | |
|---|---|---|
| CN | 203700757 U | 7/2014 |
| EP | 2802699 A1 | 11/2014 |
| JP | 126904 C2 | 10/1938 |
| JP | 2004-346447 A | 12/2004 |
| WO | 2011/089902 A1 | 7/2011 |
| WO | 2013105954 A1 | 7/2013 |

OTHER PUBLICATIONS

International Search Report issued in corresponding International Application No. PCT/JP2015/078459; dated Dec. 28, 2015 (5 pages).

Office Action issued in corresponding Chinese Application No. 201580063104.X; dated Apr. 3, 2019 (12 pages).

Office Action issued in corresponding Chinese Application No. 201580063104.X, dated Dec. 20, 2019 (13 pages).

* cited by examiner

ACRYLIC-FIBER MANUFACTURING METHOD

TECHNICAL FIELD

One or more embodiments of the invention relate to a method for manufacturing an acrylic fiber using a spinning solution in which an acrylic polymer is dissolved in an organic solvent.

BACKGROUND

In manufacturing an acrylic fiber using a wet spinning technique, after a spinning solution has been discharged from a spinning nozzle and coagulated in a coagulation bath, if coagulated filaments (fibers) that are in a wet state due to an organic solvent in the spinning solution are immediately dried as they are, the fibers adhere to one another. To address this issue, a method is generally employed in which the organic solvent in the fibers is removed beforehand through a washing step in a water tank (water bath) prior to drying. For example, Patent Document 1 discloses that prior to drying a wet-spun acrylic fiber, an organic solvent is removed by washing the acrylic fiber in a washing bath at a high temperature.

CITATION LIST

Patent Document 1: JP 2004-346447A

However, in the case where the organic solvent is removed by washing in a water bath, a large amount of water is required, and the washing time is prolonged.

Embodiments of the present invention provide a method for manufacturing an acrylic fiber with which an organic solvent in the acrylic fiber can be removed within a short period of time without using a water bath.

SUMMARY

One or more embodiments of the present invention relate to a method for manufacturing an acrylic fiber using a spinning solution in which an acrylic polymer is dissolved in an organic solvent, the method comprising a washing step that reduces an amount of organic solvent by repeatedly spraying water onto coagulated filaments obtained by solidifying the spinning solution, and pressing the coagulated filaments with nip rolls.

In one or more embodiments, the nip rolls apply a nip pressure of 0.2 MPa or higher. In one or more embodiments, in the washing step, spraying of water and pressing with the nip rolls are alternately performed eight or more times. In one or more embodiments, the organic solvent in the spinning solution is at least one selected from the group consisting of dimethyl sulfoxide, dimethylacetamide, and N,N-dimethylformamide. In one or more embodiments, the washing step is performed after the coagulated filaments have been drawn.

In one or more embodiments, the acrylic polymer comprises acrylonitrile in an amount of 20 to 85 mass %, a halogen-containing vinyl and/or a halogen-containing vinylidene in an amount of 15 to 80 mass %, and a sulfonic acid-containing monomer in an amount of 0 to 10 mass % with respect to a total mass of the acrylic polymer, and has a specific viscosity of 0.1 to 0.3.

According to one or more embodiments of the present invention, it is possible to effectively remove a solvent in an acrylic fiber within a short period of time without using a water bath.

DESCRIPTION OF THE EMBODIMENTS

Figure 1:
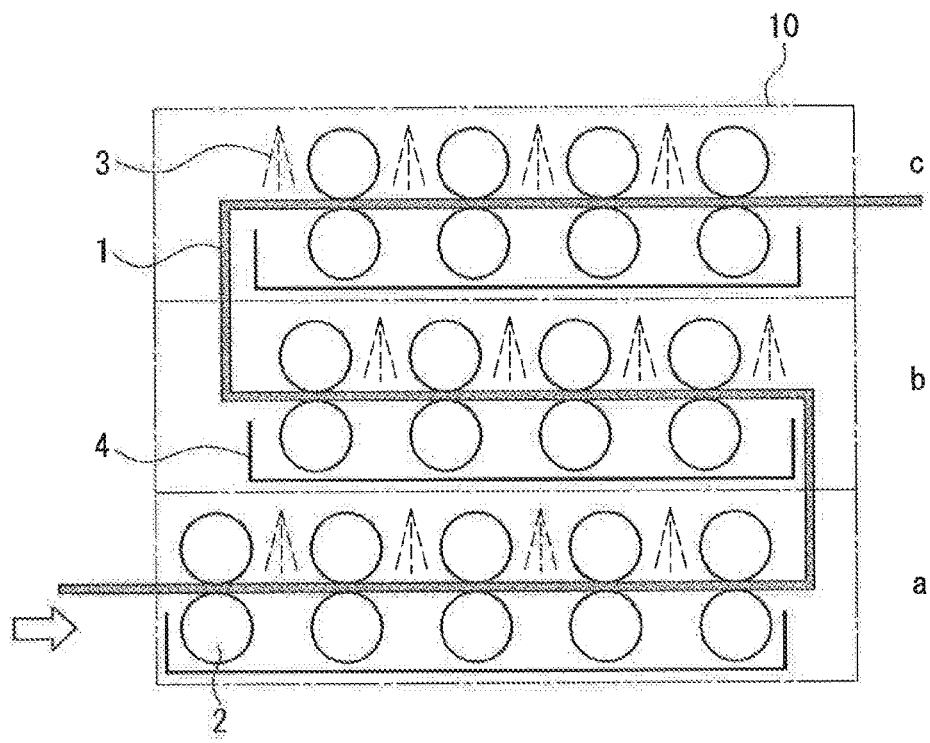
FIG. 1 is a schematic cross-sectional view of a washing device used in examples of the present invention.

According to one or more embodiments of the present invention, in a method for manufacturing an acrylic fiber using a spinning solution in which an acrylic polymer is dissolved in an organic solvent, spraying water onto coagulated filaments obtained by solidifying a spinning solution in which an acrylic polymer is dissolved in an organic solvent, and pressing the coagulated filaments with nip rolls are alternately performed. In one or more embodiments of the present invention, "nip rolls" can be any rolls that are usually used in manufacturing fibers through wet spinning, and are not limited to specific rolls. In one or more embodiments of the present invention, "pressing with nip rolls" refers to a process of applying a pressure to the coagulated filaments (acrylic fiber) while passing the coagulated filaments between a pair of upper and lower nip rolls. It is sufficient if a pressure can be applied to the coagulated filaments by the nip rolls, and there is no limitation on the method for applying the pressure. Examples of the method for applying the pressure include a method in which a pressure is applied to the upper nip roll by a cylinder, a method in which a weight is placed on the upper nip roll, and a method in which the upper nip roll is pulled down. In one or more embodiments of the present invention, "spraying of water and pressing with the nip rolls are alternately performed" means that spraying of water and pressing with the nip rolls are successively performed, that is, pressing with the nip rolls is performed after spraying of water has been performed, or spraying of water is performed after pressing with the nip rolls has been performed.

With regard to the nip rolls, for example, rubber nip rolls, nip rolls made of metal, and the like can be used as the nip rolls. A rubber nip roll (also referred to as a rubber roll) may be used as the upper nip roll, and a nip roll made of metal (also referred to as a metal roll) may be used as the lower nip roll. Examples of the material for rubber nip rolls include natural rubber, styrene-butadiene rubber, nitrile rubber, chloroprene rubber, butyl rubber, ethylene-propylene rubber, chlorosulfonated polyethylene rubber, silicone rubber, fluororubber, and urethane rubber. Moreover, a roll made of metal and wrapped with rubber may also be used as a rubber nip roll. From the standpoint of maintaining the cross-sectional shape of the fiber, the thickness of the rubber may be 3 mm or more, or 5 mm or more, or 8 mm or more. Examples of the material for nip rolls made of metal include stainless and stainless steel. The hardness of the nip rolls may be 40 to 100, or 50 to 90, or 55 to 85. In one or more embodiments of the present invention, the hardness of the nip rolls refers to a value measured on a type A durometer in conformity with JIS K 6253.

In one or more embodiments of the present invention, a spinning solution in which an acrylic polymer is dissolved in an organic solvent is used, and coagulated filaments can be obtained by discharging the spinning solution from a spinning nozzle and solidifying (coagulating) the discharged spinning solution in a coagulation bath. In light of the ease of control of the coagulation state, a mixed solution of water and an organic solvent is used as the coagulation bath. For example, a mixed solution containing an organic solvent in an amount of 20 to 75 mass % and water in an amount of 25 to 80 mass % with respect to the total mass of the mixed solution can be used as the coagulation bath, although the mixed solution is not limited to this. The organic solvent in the spinning solution and the organic solvent in the coagulation bath may be each a good solvent for the acrylic polymer, and there is no limitation on these organic solvents. In light of productivity, at least one selected from the group consisting of dimethyl sulfoxide (DMSO), dimethylacetamide (DMAc), and N,N-dimethylformamide (DMF) may be used, and in light of safety, dimethyl sulfoxide may be used. In light of the quality of the acrylic fiber and the ease of process control, the organic solvent in the spinning solution and the organic solvent in the coagulation bath may be the same organic solvent.

The washing step may be performed prior to or after drawing of the coagulated filaments, but from the standpoint of improving productivity, the washing step may be performed after the coagulated filaments have been drawn. Drawing of the coagulated filaments can be performed in a drawing bath. Although there is no limitation on the drawing bath, a mixed solution of water and an organic solvent can be used as the drawing bath. For example, a mixed solution containing an organic solvent in an amount of 20 to 75 mass % and water in an amount of 25 to 80 mass % with respect to the total mass of the mixed solution can be used. It should be noted that drawing of the coagulated filaments may also be performed in the coagulation bath. Although there is no limitation on the drawing temperature, drawing can be performed within a temperature range of 25 to 90° C., for example. There is no limitation on the drawing ratio, but from the standpoint of improving the fiber strength and the productivity, the drawing ratio may be 2 to 8 times, or 2 to 7 times, or 2 to 6 times.

In one or more embodiments, the solvent in the coagulated filaments is removed through a washing step of alternately performing spraying of water and pressing with the nip rolls, after the coagulated filaments have been drawn (drawn filaments). In the washing step, from the standpoint of improving the efficiency of removal of the organic solvent, spraying of water and pressing with the nip rolls may be alternately performed six or more times, or eight or more times, or ten or more times.

From the standpoint of sufficiently preventing fibers from fusing together or being broken during a drying step, the organic solvent content in the washed acrylic fiber may be 5 mass % or less, or 3 mass % or less, or 1 mass % or less.

In embodiments where the organic solvent has a higher boiling point than water, the content of the organic solvent in the acrylic fiber may be measured and calculated in the following manner. Into a glass sample bottle in which pure water is contained, the fiber is placed in such a manner as not to cause the pure water to overflow, and then the glass sample bottle is allowed to stand for 2 hours or longer in hot water at 95° C. or more to extract the organic solvent in the fiber. After that, the extraction liquid is analyzed by gas chromatography or the like to obtain the mass (W1) of the organic solvent in the fiber. The fiber in the glass sample bottle is washed with pure water and then dried for 4 hours or longer in an atmosphere at 110° C., and the mass (W2) of the dried fiber is measured. The content of the organic solvent in the acrylic fiber is calculated using an equation below.

Content of organic solvent in acrylic fiber (mass %)=(W1)/(W2)×100

On the other hand, in embodiments where the organic solvent has a lower boiling point than water, the content of the organic solvent in the acrylic fiber may be measured and calculated in the following manner. The fiber is placed in an organic solvent (different from the organic solvent in the fiber) in which the acrylic polymer can be dissolved, and a polymer solution obtained by thus dissolving the fiber in the organic solvent is analyzed by gas chromatography to obtain the mass (W3) of the organic solvent in the fiber. The fiber having a mass equal to that of the fiber that has been dissolved in the organic solvent is dried for 4 h or longer in an atmosphere at 110° C., and the mass (W4) of the dried fiber is measured. The content of the organic solvent in the acrylic fiber is calculated using an equation below.

Content of organic solvent in acrylic fiber (mass %)=(W3)/(W4)×100

In the washing step, from the standpoint of improving the efficiency of removal of the organic solvent in the acrylic fiber, the nip pressure applied by the nip rolls may be 0.2 MPa or higher, or 0.4 MPa or higher, or 0.6 MPa or higher. Moreover, a plurality of nip rolls may apply the same nip pressure or may apply different nip pressures. From the standpoint of maintaining the cross-sectional shape of the fiber, in the case where the organic solvent content in the acrylic fiber is 50 mass % or more, the nip pressure applied by the nip rolls may be 0.6 MPa or lower or 0.4 MPa or lower.

Figure 4A:
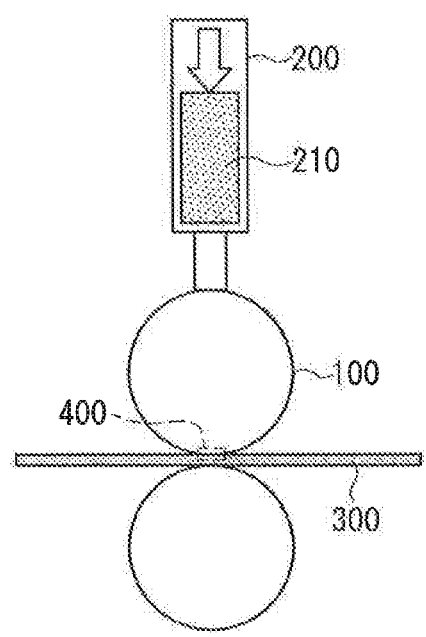
FIG. 4A is a schematic cross-sectional view for explaining a nip pressure applied by a nip roll.
Figure 4B:
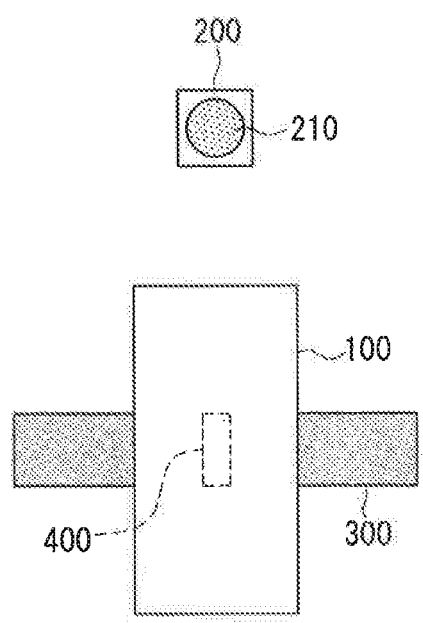
FIG. 4B is a schematic surface view for explaining the nip pressure applied by the nip roll.

In one or more embodiments of the present invention, the nip pressure applied by a nip roll is expressed as the pressure applied to a contact portion between the nip roll and the acrylic fiber (fiber bundle)/the area of the contact portion between the nip roll and the acrylic fiber. Hereinafter, the nip pressure applied by a nip roll in the case where a pressure is applied to the nip roll by a cylinder will be described using the drawings. FIG. 4A is a schematic cross-sectional view for explaining the nip pressure applied by a nip roll, and FIG. 4B is a schematic surface view for explaining the nip pressure applied by the nip roll. A cylinder 200 to which an air pressure is applied in the direction indicated by the arrow applies a pressure to an upper nip roll 100, thereby pressing an acrylic fiber 300 sandwiched between the upper nip roll 100 and a lower nip roll 100. At this time, a portion indicated by reference numeral 400 constitutes a contact portion between the upper nip roll 100 and the acrylic fiber 300. When the horizontal cross-sectional area of an inner cylinder 210 of the cylinder is regarded as the area of the inner cylinder of the cylinder, the nip pressure applied by the nip roll is calculated as follows.

Nip pressure=(air pressure applied to cylinder×area of inner cylinder of cylinder)/area of contact portion between nip roll and acrylic fiber In the washing step, there is no limitation on the means for spraying water, but in light of the ease of spraying, to the water may be sprayed using a nozzle. Any nozzle capable of spraying water can be used as the nozzle, and there is no limitation on the shape and the like of the nozzle. For example, a slit-like nozzle or a hole-shaped nozzle can be used. There is no limitation on the direction in which water is sprayed, and water may be sprayed from the side and/or from below. From the standpoint of uniformly spraying water, a shower nozzle having a plurality of holes may be used. There is no limitation on the temperature of water used for spraying of water, and, for example, water within a temperature range of 20 to 95° C. can be used. From the standpoint of improving the effect of removing the solvent, the temperature of water may be 40° C. or more, or 50° C. or more, or 60° C. or more.

The amount of water (amount of water sprayed) coming out from each nozzle used for the spraying of water per unit time may be, from the standpoint of improving the effect of removing the solvent, two times or more, or three times or more, or four times or more the mass of a resin constituting the acrylic fiber passing through the nip rolls per unit time. Moreover, from the standpoint of reducing the amount of water while improving the effect of removing the solvent, the above-described amount of water may be eight times or less, or seven times or less, or six times or less the mass of the resin constituting the acrylic fiber. The amounts of water sprayed from respective nozzles may be uniform or may be different from nozzle to nozzle. Hereinafter, the ratio of the amount of water coming out from each nozzle per unit time to the mass of the resin constituting the acrylic fiber passing through the nip rolls per unit time is also referred to as the washing ratio.

The above-described mass of the resin constituting the acrylic fiber passing through the nip rolls per unit time is calculated in the following manner. Hereinafter, the solid concentration (mass %) in the spinning solution refers to the concentration of the acrylic polymer in the spinning solution.

Mass of resin constituting acrylic fiber passing through nip rolls per unit time (g)=(amount of spinning solution discharged (L/hr)×specific gravity of spinning solution (g/L)×solid concentration in spinning solution (mass %))/100

Moreover, the above-described amount of water coming out from each nozzle per unit time is calculated as follows.

Amount of water coming out from each nozzle per unit time (g)=mass of resin constituting acrylic fiber passing through nip rolls per unit time (g)×washing ratio (times)

The strength (hitting force exerted by water) of spraying of water from each nozzle used for the spraying of water may be 0.10 kg or more, or 0.15 kg or more, or 0.20 kg or more, from the standpoint of improving the effect of removing the solvent. Moreover, from the standpoint of reducing disturbance of the acrylic fiber and securing the process stability while improving the effect of removing the solvent, the strength of spraying of water may be 1.0 kg or less, or 0.90 kg or less, or 0.80 kg or less. In one or more embodiments of the present invention, the strength of spraying of water from a nozzle can be measured using an electrobalance.

The washing step is performed using the nip rolls and the means for spraying water that are alternately arranged. In the case where pressing with the nip rolls and spraying of water are alternately performed two or more times, a washing device comprising two or more sets of nip rolls and a means for spraying water that are alternately arranged can be used. The plurality of nip rolls and means for spraying water may be alternately arranged in series, or may be alternately arranged in two or more rows. For example, as shown in FIG. 1, in a washing device 10 constituted by thirteen pairs of nip rolls 2 and twelve water spraying means 3 (shower nozzles), the nip rolls 2 and the water spraying means 3 (shower nozzles) are arranged in three rows, namely, a group "a", a group "b", and a group "c". Water receiving members 4 are disposed for the respective groups, and washing water that has been sprayed once is collected and drained by corresponding one of the water receiving members 4. The coagulated filaments move through the group "a", the group "b", and the group "c" in this order while passing through the washing device 10. The group "a" is constituted by five pairs of nip rolls 2 and four water spraying means 3 (shower nozzles) that are alternately arranged, the group "b" is constituted by four pairs of nip rolls 2 and four water spraying means 3 (shower nozzles) that are alternately arranged, and the group "c" is constituted by four pairs of nip rolls 2 and four water spraying means 3 (shower nozzles) that are alternately arranged.

The acrylic polymer may be a homopolymer of acrylonitrile, or may be a copolymer of acrylonitrile and another copolymerizable monomer. Any monomer that is copolymerizable with acrylonitrile can be used as the other copolymerizable monomer, and there is no limitation on the other copolymerizable monomer. However, for example, it is possible to use known vinyl compounds such as vinyl halides exemplified by vinyl chloride, vinyl bromide, and the like; vinylidene halides exemplified by vinylidene chloride, vinylidene bromide, and the like; unsaturated carboxylic acids exemplified by acrylic acid and methacrylic acid as well as their salts; methacrylic acid esters exemplified by methyl methacrylate; unsaturated carboxylic acid esters exemplified by glycidyl methacrylate and the like; and vinyl esters exemplified by vinyl acetate and vinyl butyrate. A sulfonic acid-containing monomer may also be used as the other copolymerizable monomer. Although there is no limitation on the sulfonic acid-containing monomer, allyl sulfonic acid, methallyl sulfonic acid, styrene sulfonic acid, isoprene sulfonic acid, 2-acrylamide-2-methylpropane sulfonic acid, as well as metallic salts, such as sodium salts, and amine salts thereof can be used. These other copolymerizable monomers can be used alone or in combination of two or more.

In light of the ease of dissolving in the organic solvent, the acrylic polymer may comprise acrylonitrile in an amount of 20 to 85 mass %, a halogen-containing vinyl and/or a halogen-containing vinylidene in an amount of 15 to 80 mass %, and a sulfonic acid-containing monomer in an amount of 0 to 10 mass % with respect to the total mass of the acrylic polymer, or may comprise acrylonitrile in an amount of 30 to 70 mass %, a halogen-containing vinyl and/or a halogen-containing vinylidene in an amount of 30 to 70 mass %, and a sulfonic acid-containing monomer in an amount of 0 to 10 mass %. Moreover, in light of the ease of dissolving in the organic solvent, the acrylic polymer may have a specific viscosity of 0.1 to 0.3 or 0.15 to 0.25. In light of the more ease of dissolving in the organic solvent, the acrylic polymer may comprise acrylonitrile in an amount of 20 to 85 mass %, a halogen-containing vinyl and/or a halogen-containing vinylidene in an amount of 15 to 80 mass %, and a sulfonic acid-containing monomer in an amount of 0 to 10 mass % with respect to the total mass of the acrylic polymer and has a specific viscosity of 0.1 to 0.3, or may comprise acrylonitrile in an amount of 30 to 70 mass %, a halogen-containing vinyl and/or a halogen-containing vinylidene in an amount of 30 to 70 mass %, and a sulfonic acid-containing monomer in an amount of 0 to 10 mass % and has a specific viscosity of 0.15 to 0.25. In one or more embodiments of the present invention, the specific viscosity of a polymer solution in which 2 g of acrylic polymer is dissolved in 1 L of dimethylformamide is measured at 30° C. using an Ostwald viscometer, and is used as the specific viscosity of the acrylic polymer.

In light of spinning stability, the spinning solution may comprise the acrylic polymer in an amount of 15 to 40 mass %, the organic solvent in an amount of 60 to 85 mass %, and water in an amount of 0 to 10 mass % with respect to the total mass of the spinning solution, or may comprise the acrylic polymer in an amount of 20 to 35 mass %, the organic solvent in an amount of 65 to 80 mass %, and water in an amount of 0 to 10 mass %.

With regard to the acrylic fiber, in the washing step, from the standpoint of improving the effect of removing the solvent, the ratio of the total fineness to the width of an acrylic fiber bundle may be 300,000 dtex/cm or less, or 200,000 dtex/cm or less, or 100, 000 dtex/cm or less, although there is no limitation on this ratio.

EXAMPLES

Hereinafter, one or more embodiments of the present invention will be described in further detail using examples below. It should be noted that the present invention is not limited to the examples below.

Example 1

An acrylic copolymer (specific viscosity: 0.174) constituted by 45.7 mass % acrylonitrile, 52.3 mass % vinyl chloride, and 2.0 mass % sulfonic acid-containing monomer was dissolved in dimethyl sulfoxide (DMSO) to produce a spinning solution having a resin concentration of 28.0 mass % and a water concentration of 3.5 mass %. The obtained spinning solution was extruded into a coagulation bath of a 57 mass % aqueous DMSO solution at 20° C. using a spinning nozzle (hole diameter: 0.3 mm, number of holes: 1250 holes) and was solidified to obtain an acrylic fiber (coagulated filaments) (spinning speed: 2 m/min), and then the acrylic fiber was drawn 3.2 times in a drawing bath of a 50 mass % aqueous DMSO solution at 80° C. In the obtained fiber, the ratio of the total fineness to the width of the fiber bundle was 60,000 dtex/cm. As shown in FIG. 1, obtained drawn filaments 1 were passed through the washing device 10 having the thirteen pairs of nip rolls 2 (diameter: 100 mm, width: 85 mm), each pair being constituted by an upper rubber roll (obtained by wrapping nitrile rubber (NBR) having a hardness of 80 and a thickness of 6 mm around a stainless roll) and a lower metal drive roll made of SUS304, and the twelve shower nozzles 3 each producing a fan-shaped spray. During passage of the drawn filaments 1 through the washing device 10, the drawn filaments 1 were washed by being alternately subjected to application of a pressure by a cylinder while passing between each of the rubber rolls and corresponding one of the metal drive rolls, and spraying of water using the shower nozzles 3. Thus, DMSO in the drawn filaments 1 was removed. The washing device 10 was equipped with the water receiving members 4, and washing water that was sprayed once was collected and drained by the water receiving members 4. It should be noted that the thirteen pairs of nip rolls 2 were divided into three groups and arranged in three rows, and the nip rolls belonging to a single group applied the same nip pressure. In all of the groups, the nip rolls applied a nip pressure of 0.96 MPa. The group "a" was constituted by five pairs of nip rolls 2 and four water spraying means 3 (shower nozzles) that were alternately arranged, the group "b" was constituted by four pairs of nip rolls 2 and four water spraying means 3 (shower nozzles) that were alternately arranged, the group "c" was constituted by four pairs of nip rolls 2 and four water spraying means 3 (shower nozzles) that were alternately arranged. The drawn filaments 1 moved through the group "a", the group "b", and the group "c" in this order while passing through the washing device 10. Table 2 below shows the nip pressures applied by the nip rolls of the respective groups. The amount of water (amount of water sprayed) coming out from each of the shower nozzles per unit time was set to be four times the mass of the resin constituting the acrylic fiber passing through the nip rolls per unit time. The temperature of water sprayed by each shower nozzle was set at 80° C. The hitting force exerted by water sprayed by each shower nozzle was set at 0.15 kg. Samples of the acrylic fiber washed for respective washing times shown in Table 1 below were collected, and the content of the organic solvent (DMSO) in the acrylic fiber was measured and calculated in the following manner. Table 1 shows the results. Specifically, the content of the organic solvent in the acrylic fiber was measured and calculated after a washing time of 0 seconds (after pressing with the first pair of nip rolls), after a washing time of 2.4 seconds (after pressing with the third pair of nip rolls), after a washing time of 4.8 seconds (after pressing with the fifth pair of nip rolls), after a washing time of 7.2 seconds (after pressing with the seventh pair of nip rolls), after a washing time of 9.6 seconds (after pressing with the ninth pair of nip rolls), after a washing time of 12.0 seconds (after pressing with the eleventh pair of nip rolls), and after a washing time of 14.4 seconds (after pressing with the thirteenth pair of nip rolls).

Example 2

DMSO in the acrylic fiber was removed in the same manner as in Example 1 except that in all of the groups, the nip pressure applied by the nip rolls was set at 1.92 MPa.

Example 3

DMSO in the acrylic fiber was removed in the same manner as in Example 2 except that the amount of water (amount of water sprayed) coming out from each of the shower nozzles per unit time was set to be six times the mass of the resin constituting the acrylic fiber passing through the nip rolls per unit time.

Comparative Example 1

Figure 2:
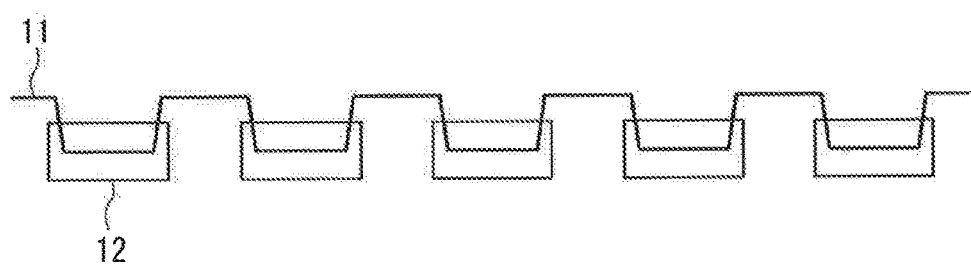
FIG. 2 is a schematic cross-sectional view of a washing device used in Comparative Example 1.

An acrylic copolymer (specific viscosity: 0.188) constituted by 49.4 mass % acrylonitrile, 48.1 mass % vinyl chloride, and 2.5 mass % sulfonic acid-containing monomer was dissolved in dimethyl sulfoxide (DMSO) to produce a spinning solution having a resin concentration of 27.0 mass % and a water concentration of 3.4 mass %. This spinning solution was extruded into a coagulation bath of a 65 mass % aqueous DMSO solution at 30° C. using a spinning nozzle (hole diameter: 0.35 mm, number of holes: 50 holes) and was solidified to obtain an acrylic fiber (coagulated filaments) (spinning speed: 2 m/min), and then the obtained acrylic fiber was drawn 3.3 times in a drawing bath of a 30 mass % aqueous DMSO solution at 70° C. As shown in FIG. 2, obtained drawn filaments 11 were immersed in a water bath 12 for 15 seconds, then withdrawn into air by a metal drive roll (not shown) made of SUS, and immediately fed to the next bath 12 and immersed therein for 15 seconds. In this manner, the drawn filaments 11 were washed by being sequentially immersed in five water tanks 12, and thus, DMSO in the drawn filaments was removed. The water temperature in the baths at this time was set at 80° C. Samples of the thus washed acrylic fiber were collected after the immersion in the first water tank (after a washing time of 15 seconds), after the immersion in the second water tank (after a washing time of 30 seconds), after the immersion in the third water tank (after a washing time of 45 seconds), after the immersion in the fourth water tank (after a washing time of 60 seconds), and after the immersion in the fifth water tank (after a washing time of 75 seconds), and the content of the organic solvent in the acrylic fiber was measured and calculated.

Comparative Example 2

Figure 3:
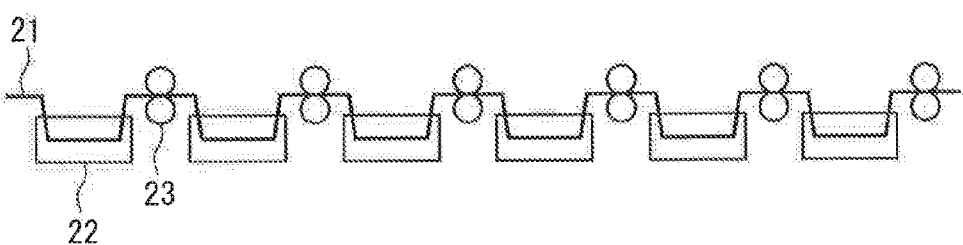
FIG. 3 is a schematic cross-sectional view of a washing device used in Comparative Example 2.

An acrylic copolymer (specific viscosity: 0.18) constituted by 46.4 mass % acrylonitrile, 51.1 mass % vinyl chloride, and 2.5 mass % sulfonic acid-containing monomer was dissolved in dimethyl sulfoxide (DMSO) to produce a spinning solution having a resin concentration of 27.0 mass % and a water concentration of 3.4 mass %. This spinning solution was extruded into a coagulation bath of a 65 mass % aqueous DMSO solution at 30° C. using a spinning nozzle (hole diameter: 0.35 mm, number of holes: 50 holes) and was solidified to obtain an acrylic fiber (coagulated filaments) (spinning speed: 2 m/min), and then the obtained acrylic fiber was drawn 3.3 times in a drawing bath of a 30 mass % aqueous DMSO solution at 70° C. As shown in FIG. 3, obtained drawn filaments 21 were immersed in a water bath 22 for 2 seconds, then pressed while being withdrawn sandwiched between nip rolls 23, that is, the upper rubber roll (obtained by wrapping nitrile rubber (NBR) having a hardness of 80 and a thickness of 6 mm around a stainless roll) and the lower metal drive roll made of SUS304, and again immersed in a bath 22 for 2 seconds. In this manner, the drawn filaments 21 were washed by being passed through six water tanks 22 and six pairs of nip rolls 23 that were alternately arranged. Thus, DMSO in the drawn filaments was removed. The nip pressure applied by each nip roll was 2.0 MPa. The water temperature in the baths at this time was set at 80° C. Samples of the washed acrylic fiber were collected after pressing with the first pair of nip rolls (after a washing time of 2 seconds), after pressing with the second pair of nip rolls (after a washing time of 4 seconds), after pressing with the third pair of nip rolls (after a washing time of 6 seconds), after pressing with the fourth pair of nip rolls (after a washing time of 8 seconds), after pressing with the fifth pair of nip rolls (after a washing time of 10 seconds), and after pressing with the sixth pair of nip rolls (after a washing time of 12 seconds), and the content of the organic solvent in the acrylic fiber was measured and calculated.

In Examples 1 to 3 and Comparative Examples 1 and 2, as described above, samples of the acrylic fibers that were washed for respective washing times shown in Table 1 below were collected, and the content of the organic solvent (DMSO) in each acrylic fiber was measured and calculated in the following manner. Table 1 below shows the results.

(Measurement of Content of Organic Solvent in Acrylic Fiber)

The content of the organic solvent in each acrylic fiber was measured and calculated in the following manner. Into a glass sample bottle in which pure water was contained, the fiber was placed in such a manner as not to cause the pure water to overflow, and then the glass sample bottle was allowed to stand for 2 h or longer in hot water at 95° C. or more to extract the organic solvent in the fiber. After that, the extraction liquid was analyzed by gas chromatography to obtain the mass ($W1$) of the organic solvent in the fiber. The fiber in the glass sample bottle was washed with pure water and then dried for 4 h or longer in an atmosphere at 110° C., and the mass ($W2$) of the dried fiber was measured. The content of the organic solvent in the acrylic fiber was calculated using an equation below.

Content of organic solvent in acrylic fiber (mass %)=$(W1)/(W2) \times 100$

TABLE 1

| Washing time (sec) | Organic solvent content (%) | | | Washing time (sec) | Organic solvent content (%) | Washing time (sec) | Organic solvent content (%) |
| --- | --- | --- | --- | --- | --- | --- | --- |
| | Ex. 1 | Ex. 2 | Ex. 3 | | Com. Ex. 1 | | Com. Ex. 2 |
| 0 | 115.0 | 115.0 | 115.0 | 0 | 116.8 | 0 | 167.7 |
| 2.4 | 46.7 | 36.9 | 32 | 15 | 65.2 | 2 | 54.5 |
| 4.8 | 21.3 | 17.8 | 14.9 | 30 | 26.8 | 4 | 30.9 |
| 7.2 | 9.8 | 9.9 | 5.4 | 45 | 12.2 | 6 | 14.8 |
| 9.6 | 5.3 | 4.5 | 2.6 | 60 | 0.6 | 8 | 9.1 |
| 12 | 2.8 | 2.5 | 1.0 | 75 | 0.4 | 10 | 5.3 |
| 14.4 | 1.0 | 0.86 | 0.3 | / | / | 12 | 2.2 |

As can be seen from the results in Table 1 above, in Examples 1 to 3, since the acrylic fibers were washed by alternately performing the spraying of water and the pressing with the nip rolls, the organic solvents in the respective acrylic fibers were able to be effectively removed within extremely shorter washing times than in Comparative Example 1, in which the acrylic fiber was washed using the water tanks (water baths). Moreover, in Examples 1 to 3, compared with Comparative Example 2, in which the washing using the water baths and the pressing with the nip rolls were alternately performed, the organic solvents in the respective acrylic fibers were able to be effectively removed within a short period of time even though a water bath was not used.

Examples 4 to 11

DMSO in acrylic fibers was removed in the same manner as in Example 1 except that the nip pressures applied by the nip rolls of the respective groups were set as shown in Table 2 below.

Examples 12 and 13

DMSO in acrylic fibers was removed in the same manner as in Example 3 except that the nip pressures applied by the nip rolls of the respective groups were set as shown in Table 2 below.

In each of Examples 1 to 13, samples of the acrylic fiber were collected after passing through the nip rolls respective numbers of times shown in Table 2 below, and the content of the organic solvent (DMSO) in the acrylic fiber was measured and calculated in the above-described manner. Table 2 below shows the results. Table 2 below also shows corresponding washing times.

TABLE 2

|     | Nip pressure (MPa) | | | Washing ratio | Organic solvent content in acrylic fiber (mass %) Number of times of passage through nip rolls (times) | | | | | | | Single fiber fineness | Number of fibers |
| --- | --- | --- | --- | --- | --- | --- | --- | --- | --- | --- | --- | --- | --- |
|     |     |     |     |     | 1 | 3 | 5 | 7 | 9 | 11 | 13 |     |     |
|     |     |     |     |     | Washing time (sec) | | | | | | |     |     |
| Ex. | Group "a" | Group "b" | Group "c" | (times) | 0 | 2.4 | 4.8 | 7.2 | 9.6 | 10.8 | 14.4 | (dtex) | (fibers) |
| 1 | 0.96 | 0.96 | 0.96 | 4 | 115 | 46.7 | 21.3 | 9.8 | 5.3 | 2.8 | 1.0 | 72.5 | 1250 |
| 2 | 1.92 | 1.92 | 1.92 | 4 | 115 | 36.9 | 17.8 | 9.9 | 4.5 | 2.5 | 0.86 | 72.5 | 1250 |
| 3 | 1.92 | 1.92 | 1.92 | 6 | 115 | 32.0 | 14.9 | 5.4 | 2.6 | 1.0 | 0.35 | 72.5 | 1250 |
| 4 | 0.48 | 0.96 | 1.44 | 4 | 115 | 51.6 | 26.1 | 14.5 | 6.5 | 4.2 | 1.86 | 72.5 | 1250 |
| 5 | 1.44 | 1.44 | 1.44 | 4 | 115 | 40.5 | 19.6 | 8.7 | 4.7 | 2.4 | 0.73 | 72.5 | 1250 |
| 6 | 2.4 | 2.4 | 2.4 | 4 | 115 | 36.7 | 17.9 | 9.7 | 3.8 | 2.1 | 0.59 | 72.5 | 1250 |
| 7 | 0.48 | 0.96 | 1.92 | 4 | 115 | 49.5 | 23.9 | 10.1 | 5.4 | 2.2 | 0.86 | 72.5 | 1250 |
| 8 | 0.48 | 0.96 | 2.4 | 4 | 115 | 44.6 | 23.9 | 10.0 | 5.4 | 2.9 | 0.99 | 72.5 | 1250 |
| 9 | 0.48 | 1.44 | 1.44 | 4 | 115 | 47.8 | 24.5 | 9.7 | 4.7 | 2.8 | 0.88 | 72.5 | 1250 |
| 10 | 0.48 | 1.44 | 1.92 | 4 | 115 | 41.4 | 21.0 | 6.5 | 3.0 | 2.0 | 0.54 | 72.5 | 1250 |
| 11 | 0.48 | 1.42 | 2.4 | 4 | 115 | 46.1 | 23.3 | 8.5 | 3.7 | 1.6 | 0.39 | 72.5 | 1250 |
| 12 | 0.48 | 0.96 | 1.44 | 6 | 115 | 37.0 | 18.9 | 6.3 | 2.3 | 1.4 | 0.37 | 72.5 | 1250 |
| 13 | 0.48 | 1.44 | 1.44 | 6 | 115 | 40.4 | 21.0 | 6.7 | 3.1 | 1.5 | 0.54 | 72.5 | 1250 |

As can be seen from the results in Table 2 above, in all of the examples, when the number of times the pressing with the nip rolls and the spraying of water were alternately performed exceeded 7, the content of the organic solvent in the acrylic fiber was equal to or lower than 7.0 mass %, and when the number of times the pressing and the spraying were alternately performed exceeded 9, the content of the organic solvent in the acrylic fiber was about 5.0 mass %. It was found from comparisons between Example 2 and Example 3, between Example 4 and Example 12, and between Example 9 and Example 13 that the larger the amount of water sprayed, the higher the effect of removing the solvent.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

LIST OF REFERENCE NUMERALS

1, 11, 21, 300 Acrylic fiber (drawn filament)
2, 23, 100 Nip roll
3 Shower nozzle
4 Water receiving member
10 Washing device
12, 22 Water tank (water bath)
200 Cylinder
210 Inner cylinder of cylinder
400 Contact portion between acrylic fiber and nip roll

The invention claimed is:

1. A method for manufacturing an acrylic fiber using a spinning solution, the method comprising:
   preparing coagulated filaments by solidifying the spinning solution comprising an acrylic polymer and an organic solvent; and
   reducing an amount of the organic solvent in the coagulated filaments by repeatedly spraying water onto the coagulated filaments and passing the coagulated filaments between an upper nip roll and a lower nip roll while pressing the coagulated filaments with the upper nip roll and the lower nip roll,
   wherein the spraying of water is performed by nozzles, and an amount of water coming out from each of the nozzles per unit time is two times or more and six times or less a mass of resin constituting the acrylic fiber passing through the nip rolls per unit time.

2. The method for manufacturing an acrylic fiber according to claim 1, wherein the nip rolls apply a nip pressure of 0.2 MPa or higher.

3. The method for manufacturing an acrylic fiber according to claim 1, wherein the spraying and the passing are repeatedly performed eight or more times.

4. The method for manufacturing an acrylic fiber according to claim 1, wherein the organic solvent in the spinning solution is at least one selected from the group consisting of dimethyl sulfoxide, dimethylacetamide, and N,N-dimethylformamide.

5. The method for manufacturing an acrylic fiber according to claim 1, wherein the reducing is performed after the coagulated filaments have been drawn.

6. The method for manufacturing an acrylic fiber according to claim 1, wherein the acrylic polymer comprises acrylonitrile in an amount of 20 to 85 mass %, a halogen-containing vinyl and/or a halogen-containing vinylidene in an amount of 15 to 80 mass %, and a sulfonic acid-containing monomer in an amount of 0 to 10 mass % with respect to a total mass of the acrylic polymer, and
   wherein the acrylic polymer has a specific viscosity of 0.1 to 0.3.

7. The method for manufacturing an acrylic fiber according to claim 2, wherein the spraying and the passing are repeatedly performed eight or more times.

8. The method for manufacturing an acrylic fiber according to claim 2, wherein the organic solvent in the spinning solution is at least one selected from the group consisting of dimethyl sulfoxide, dimethylacetamide, and N,N-dimethylformamide.

9. The method for manufacturing an acrylic fiber according to claim 3, wherein the organic solvent in the spinning solution is at least one selected from the group consisting of dimethyl sulfoxide, dimethylacetamide, and N,N-dimethylformamide.

10. The method for manufacturing an acrylic fiber according to claim 4, wherein the organic solvent in the spinning solution is at least one selected from the group consisting of dimethyl sulfoxide, dimethylacetamide, and N,N-dimethylformamide.

11. The method for manufacturing an acrylic fiber according to claim 7, wherein the organic solvent in the spinning solution is at least one selected from the group consisting of dimethyl sulfoxide, dimethylacetamide, and N,N-dimethylformamide.

12. The method for manufacturing an acrylic fiber according to claim 2, wherein the nip rolls apply a nip pressure of 0.4 MPa or higher.

13. The method for manufacturing an acrylic fiber according to claim 3, wherein the spraying and the passing are repeatedly performed thirteen or less times.

14. The method for manufacturing an acrylic fiber according to claim 1, wherein the spraying of water is performed by nozzles, and a strength of the spraying of water from each of the nozzles is 0.10 kg or more.

15. The method for manufacturing an acrylic fiber according to claim 1, wherein a ratio of a total fineness to a width of a bundle of the acrylic fiber is 300,000 dtex/cm or less.

16. The method for manufacturing an acrylic fiber according to claim 2, wherein the spraying of water is performed by nozzles, and a strength of the spraying of water from each of the nozzles is 0.10 kg or more.

17. The method for manufacturing an acrylic fiber according to claim 2, wherein a ratio of a total fineness to a width of a bundle of the acrylic fiber is 300,000 dtex/cm or less.

* * * * *